United States Patent
Takagi

(10) Patent No.: US 7,258,212 B2
(45) Date of Patent: Aug. 21, 2007

(54) OIL PRESSURE CONTROL DEVICE FOR AUTOMATIC TRANSMISSION

(75) Inventor: Akira Takagi, Obu (JP)

(73) Assignee: DENSO Corporation, Kariya, Aichi-Pref. (JP)

( * ) Notice: Subject to any disclaimer, the term of this patent is extended or adjusted under 35 U.S.C. 154(b) by 271 days.

(21) Appl. No.: 11/174,549

(22) Filed: Jul. 6, 2005

(65) Prior Publication Data

US 2006/0030455 A1    Feb. 9, 2006

(30) Foreign Application Priority Data

Aug. 3, 2004    (JP) ............................. 2004-226819

(51) Int. Cl.
*F16H 61/00*    (2006.01)
(52) U.S. Cl. ..................... 192/3.57; 192/87.1
(58) Field of Classification Search ............... None
See application file for complete search history.

(56) References Cited

U.S. PATENT DOCUMENTS 4,465,167 A * 8/1984 Fujioka ..................... 192/3.57

2003/0042104 A1 * 3/2003 Matsufuji et al. ........ 192/87.11

FOREIGN PATENT DOCUMENTS

JP    2002-267007    9/2002

* cited by examiner

*Primary Examiner*—Saul Rodriguez
(74) *Attorney, Agent, or Firm*—Nixon & Vanderhye P.C.

(57) ABSTRACT

In an automatic transmission having multiple oil pressure control valves for controlling friction engagement elements, a first and second pressure modulating valves are provided between an oil pressure generating means (pump) and the oil pressure control valves. A switching valve is further provided between the pressure modulating valves and the oil pressure control valves. In case that one of the pressure modulating valves becomes out of order, the oil pressure of a working oil is supplied to the oil pressure control valves from the other pressure modulating valve, so that the automatic transmission can be continuously operated even in the case that one of the pressure modulating valves becomes out of order.

5 Claims, 4 Drawing Sheets

OIL PRESSURE CONTROL DEVICE FOR AUTOMATIC TRANSMISSION

CROSS REFERENCE TO RELATED APPLICATION

This application is based on Japanese Patent Application No. 2004-226819, which is filed on Aug. 3, 2004, the disclosure of which is incorporated herein by reference.

1. Field of the Invention

The present invention relates to an oil pressure control device for an automatic transmission of a motor vehicle.

2. Background of the Invention

In a recent automatic transmission for a motor vehicle, a number of multiple-stage gear changes is increased, and a number of electromagnetic oil pressure control valves for controlling oil pressure to be supplied to respective friction engagement elements (such as, clutches and brakes in the transmission device) is correspondingly increased. A pressure modulating valve is generally provided in fluid passages connecting an oil pressure generating means (such as a pump) with the oil pressure control valves, so that an original oil pressure from the pump is modulated (decreased) and supplied to the respective oil pressure control valves. It has become, however, more difficult to supply, by a single pressure modulating valve, a sufficient amount of working oil with a sufficiently high oil pressure to the increased number of the oil pressure control valves. Accordingly, it is known in the art that multiple pressure modulating valves are provided to assure the sufficient amount of the working oil to be supplied to the respective oil pressure control valves, for example, as disclosed in Japanese Patent Publication No. 2002-267007.

In the automatic transmission disclosed in the above prior art, multiple electromagnetic oil pressure control valves are divided into two groups, each having multiple friction engagement elements (clutches and brakes) for independently enabling a forward travel of a motor vehicle in case of a system failure. A first and second pressure modulating valves are respectively provided in oil passages, through which an oil pressure generating means (pump) is connected to the respective groups of the electromagnetic oil pressure control valves, wherein the oil pressure of the working oil is respectively modulated by the first and second pressure modulating valves. Even in the case that one (first) of the pressure modulating valves becomes out of order in the above prior art automatic transmission, the forward travel of the vehicle can be continued by the operation of the other (second) pressure modulating valve.

However, the electromagnetic oil pressure control valves to be operated by the respective pressure modulating valves belong to the respective different groups, as described above, and therefore, only the sixth gear change position of the automatic transmission can be operated by the second pressure modulating valve. On the other hand, if the second pressure modulating valve becomes out of order, the first and third gear change positions of the automatic transmission can be operated by the first pressure modulating valve.

As above, in the prior art automatic transmission, the forward travel of the vehicle in case of the failure of the pressure modulating valves is limited to the vehicle travel with the limited gear change positions of automatic transmission. Accordingly, it is difficult to drive the vehicle when a load to the vehicle travel is high, for example at a high speed and/or on an up-hill road.

Furthermore, in the above mentioned prior art automatic transmission, a primary pressure regulating valve is provided between the oil pressure generating means (pump) and the first and second pressure modulating valves, wherein the primary pressure regulating valve produces a line pressure for the first and second pressure modulating valves, which is controlled at an appropriate operational pressure depending on a vehicle travel load.

SUMMARY OF THE INVENTION

The present invention is made in view of the above problems. It is, therefore, an object of the present invention to provide an oil pressure control device for an automatic transmission of a motor vehicle, in which a sufficient amount of a driving force can be transmitted from an engine to vehicle wheels through the automatic transmission, even in the case that one of multiple pressure modulating valves of the automatic transmission becomes out of order.

According to a feature of the present invention, multiple (first and second) pressure modulating valves are provided between an oil pressure generating means (such as a pump) and multiple oil pressure control valves for controlling operations of friction engagement elements of an automatic transmission. A switching valve is further provided between the pressure modulating valves and the multiple oil pressure control valves, so that the modulated oil pressure by the pressure modulating valves can be supplied to the respective oil pressure control valves through the switching valve. Since all of the oil pressure control valves are operatively connected, by the switching valve, to at least one of the pressure modulating valves, all of the oil pressure control valves can be operated by the oil pressure supplied from either one of the pressure modulating valves, even if the other pressure modulating valve become out of order.

According to another feature of the present invention, the switching valve comprises a spool which is movably supported in a casing of the switching valve. The spool is axially moved by a pressure difference between the modulated pressures from the first and second pressure modulating valves, to connect one of the pressure modulating valves with the oil pressure control valves, and disconnect the oil pressure control valves from the other pressure modulating valve. As above, the switching valve switches over the communication between the pressure modulating valves and the oil pressure control valves, due to the pressure difference, the structure of the switching valve becomes simpler.

According to a further feature of the present invention, a switching valve comprises a ball member movably supported in a switching chamber, and the ball member is moved therein by the pressure difference between the pressures from the pressure modulating valves, to close one of inlet openings of the switching chamber, the oil pressure at which is lower than that at the other inlet opening. This makes it also possible to make the switching valve in a simpler structure.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

An embodiment of an oil pressure control device according to the present invention is explained with reference to the drawings.

Figure 1:
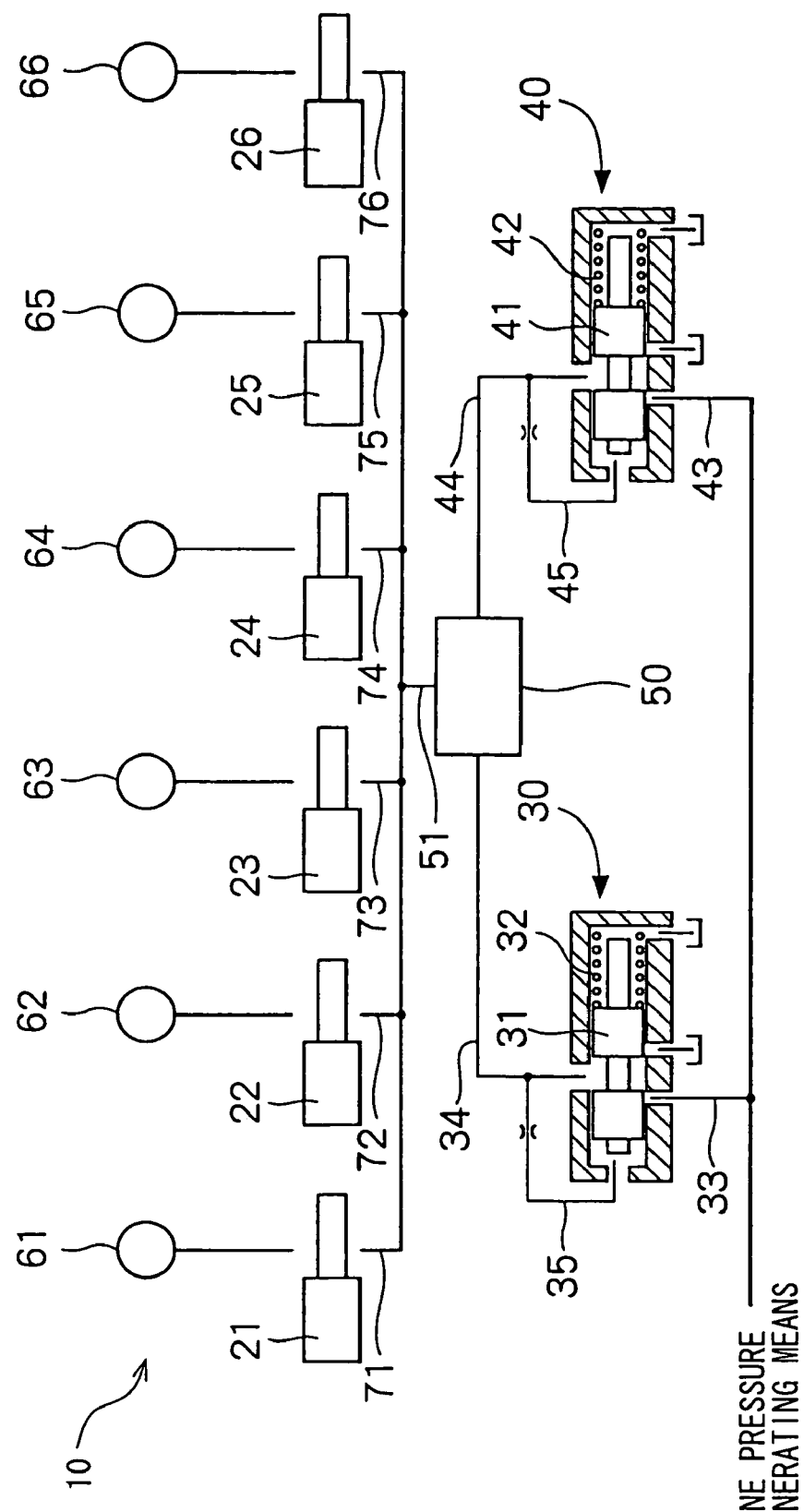
FIG. 1 is a schematic view showing an oil pressure control device for an automatic transmission according to a first embodiment of the present invention.

A first embodiment of the present invention is shown in FIG. 1. An oil pressure control device 10 for an automatic transmission of a motor vehicle comprises multiple (six) electromagnetic oil pressure control valves 21 to 26 respectively connected to friction engagement elements 61 to 66 (such as clutches and brakes), multiple (first and second) pressure modulating valves 30 and 40 respectively acting as a pressure decreasing valve, and a switching valve 50.

The electromagnetic oil pressure control valves 21 to 26 are connected to the friction engagement elements 61 to 66, as described above, to control oil pressure to be applied to the respective friction engagement elements 61 to 66, so that engagement or disengagement of the elements 61 to 66 is controlled. The electromagnetic oil pressure control valves 21 to 26 are respectively driven by a driver circuit (not shown), and the oil pressure applied to the respective friction engagement elements 61 to 66 is controlled by an electric power supplied to the respective electromagnetic oil pressure control valves 21 to 26. For that purpose, the electromagnetic oil pressure control valve of a proportional type is used. It is, however, not always necessary to use the electromagnetic oil pressure control valve for all of the oil pressure control valves 21 to 26. Instead, hydraulically controlled valves can be used.

The first and second pressure modulating valves 30 and 40 are connected to a source of an oil pressure generating means (not shown) for the automatic transmission system, and decrease a line pressure of the working oil supplied from the oil pressure generating means to the pressure modulating valves 30 and 40. The oil pressure decreased by the pressure modulating valves 30 and 40 is then applied to the electromagnetic oil pressure control valves 21 to 26 through the switching valve 50. The first pressure modulating valve 30 comprises a spool 31 and a spring 32. A line pressure passage 33, an oil pressure passage 34 and a return passage 35 are connected to the pressure modulating valve 30. The line pressure of the working oil is supplied to the line pressure passage 33 from the oil pressure generating means (not shown). A modulated (decreased) oil pressure modulated by the pressure modulating valve 30 is supplied to the oil pressure passage 34. The return passage 35 branches off from the oil pressure passage 34. A part of the modulated oil pressure outputted from the pressure modulating valve 30 is feed-backed to the pressure modulating valve 30 through the return passage 35. The spool 31 receives a force of the line pressure inputted from the line pressure passage 33, a force of the modulated pressure feed-backed through the return passage 35, and a force of the spring 32, so that the spool 31 is axially moved depending on a pressure balance of the above forces, to control the oil pressure (the modulated pressure) of the working oil to be outputted from the pressure modulating valve 30.

As in the same manner to the first pressure modulating valve 30, the second pressure modulating valve 40 comprises a spool 41 and a spring 42. A line pressure passage 43, an oil pressure passage 44 and a return passage 45 are connected to the second pressure modulating valve 40. The spool 41 receives a force of the line pressure inputted from the line pressure passage 43, a force of the modulated pressure feed-backed through the return passage 45, and a force of the spring 42, so that the spool 41 is axially moved depending on a pressure balance of the above forces, to control the oil pressure (the modulated pressure) of the working oil to be outputted from the pressure modulating valve 40.

The oil pressure passages 34 and 44 of the first and second pressure modulating valves 30 and 40 are connected to the switching valve 50. An oil pressure supply passage 51 is further connected to the switching valve 50. Multiple (six in this embodiment) oil pressure sub passages 71 to 76 branch off from the oil pressure supply passage 51 and respectively connected to the electromagnetic oil pressure control valves 21 to 26. The modulated oil pressure from the pressure modulating valves 30 and 40 are operatively supplied to the electromagnetic oil pressure control valves 21 to 26 through the switching valve 50.

Figure 2:
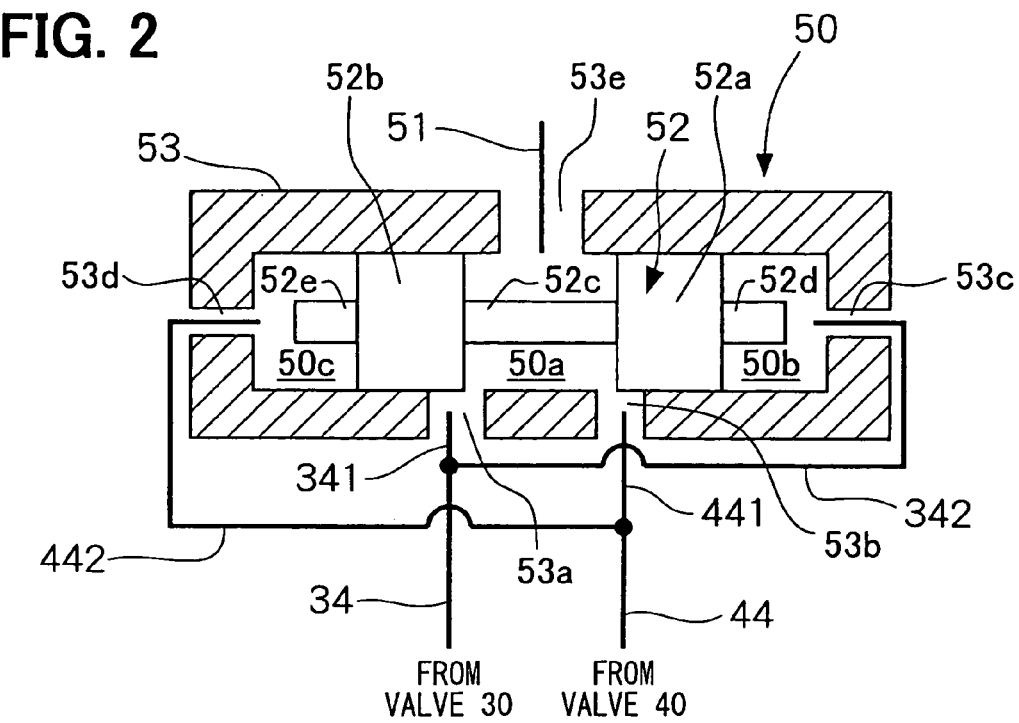
FIG. 2 is a schematic view showing a switching valve for the oil pressure control device according to the first embodiment, in which both pressure modulating valves are operating in order.

The switching valve 50 comprises a spool 52, as shown in FIG. 2. The spool 52 is axially movable in a casing 53.

The casing 53 has a first to a fourth inlet ports 53a to 53d and an outlet port 53e. The spool 52 has a pair of spool valves 52a and 52b which are connected by a spool shaft 52c with each other. The switching valve 50 has a main chamber 50a defined by the casing 53 and the pair of the spool valves 52a and 52b, and a pair of sub chambers 50b and 50c respectively defined by the casing 53 and the spool valves 52a and 52b. In this structure of the switching valve 50, the outlet port 53e is always communicated with the main chamber 50a, whereas the first and second inlet ports 53a and 53b are operatively communicated with the main chamber 50a, depending on an axial position of the spool 52. The third and fourth inlet ports 53c and 53d are also operatively communicated with the respective sub chambers 50b and 50c depending on the axial position of the spool 52.

A main passage 341 and a sub-passage 342 branch off from the oil pressure passage 34, so that the modulated oil pressure from the pressure modulating valve 30 is supplied to the main chamber 50a of the switching valve 50 through the main passage 341 connected at the first inlet port 53a and to the sub chamber 50b through the sub-passage 342 connected at the third inlet port 53c. In the same manner, a main passage 441 and a sub-passage 442 branch off from the oil pressure passage 44, so that the modulated oil pressure from the pressure modulating valve 40 is supplied to the main chamber 50a of the switching valve 50 through the main passage 441 connected at the second inlet port 53b and to the sub chamber 50c through the sub-passage 442 connected at the fourth inlet port 53d. The spool 52 is movable in both axial directions in the casing 53, depending on a pressure difference between the oil pressures from the first pressure modulating valve 30 through the main and sub passages 341 and 342 and the oil pressure from the second pressure modulating valve 40 through the main and sub passages 441 and 442, namely a pressure difference between the oil pressures in the sub chambers 50b and 50c. When the spool 52 is axially moved, the switching valve 50 operatively connects or disconnects the oil pressure supply passage 51 to or from the main passages 341 and 441, respectively.

An operation of the above oil pressure control device 10 is explained.

Even when the both of pressure modulating valves 30 and 40 are operating in order, a slight pressure difference appears between the modulated oil pressures from the pressure modulating valves 30 and 40, because of a pressure change in the line pressure passages 33 and 43 and/or tolerances between the two pressure modulating valves 30 and 40. However, the spool 52 is not moved in either direction, unless the pressure difference between the modulated oil pressures from the pressure modulating valves 30 and 40 becomes higher than a predetermined value, because the modulated oil pressures from the pressure modulating valves 30 and 40 are applied to the spool 52 through the respective sub-passages 342 and 442 in addition to the pressure supply through the respective main passages 341 and 441. Namely, the spool 52 is not moved from a position shown in FIG. 2 and held at this position, so long as the pressure difference between the modulated oil pressures from the pressure modulating valves 30 and 40 is lower than the predetermined value. With the position of the spool 52 in FIG. 2, both of the main passages 341 and 441 are connected to the oil pressure supply passage 51 through the main chamber 50a, so that the modulated oil pressures from the pressure modulating valves 30 and 40 can be supplied to the electromagnetic oil pressure control valves 21 to 26 through the switching valve 50 and the oil pressure supply passage 51. As above, the sufficient oil pressure and the sufficient amount of the working oil can be supplied to the electromagnetic oil pressure control valves 21 to 26 from the pressure modulating valves 30 and 40, in the case that both of the pressure modulating valves 30 and 40 are operating in order.

Figure 3:
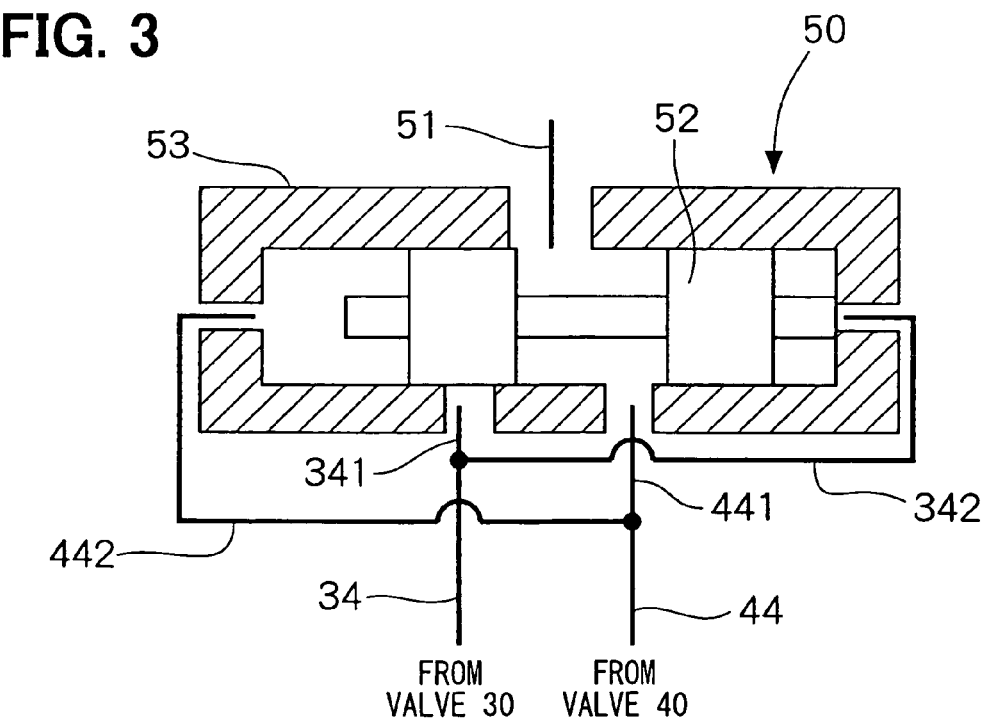
FIG. 3 is a schematic view showing the switching valve according to the first embodiment, in which a first pressure modulating valve 30 becomes out of order.

In the case that the first pressure modulating valve 30 becomes out of order and a high pressure of the working oil can not be outputted from the first pressure modulating valve 30, the oil pressure from the second pressure modulating valve 40 becomes higher than that from the first pressure modulating valve 30. Then, the spool 52 is moved in the rightward direction, as shown in FIG. 3, that is, a direction toward the sub chamber 50b connected to the sub-passage 342. As a result, the main passage 341 of the first pressure modulating valve 30 is disconnected from the oil pressure supply passage 51, whereas the main passage 441 from the second pressure modulating valve 40 is kept connected with the oil pressure supply passage 51 through the main chamber 50a. The oil pressure of the working oil is supplied to the respective electromagnetic oil pressure control valves 21 to 26 through the communication between the main passage 441 and the oil pressure supply passage 51 through the main chamber 50a of the switching valve 50, and through the respective oil pressure sub-passages 71 to 76. Accordingly, the modulated oil pressure can be supplied from the second pressure modulating valve 40 to the respective electromagnetic oil pressure control valves 21 to 26, even in the case that the first pressure modulating valve 30 becomes out of order.

Figure 4:
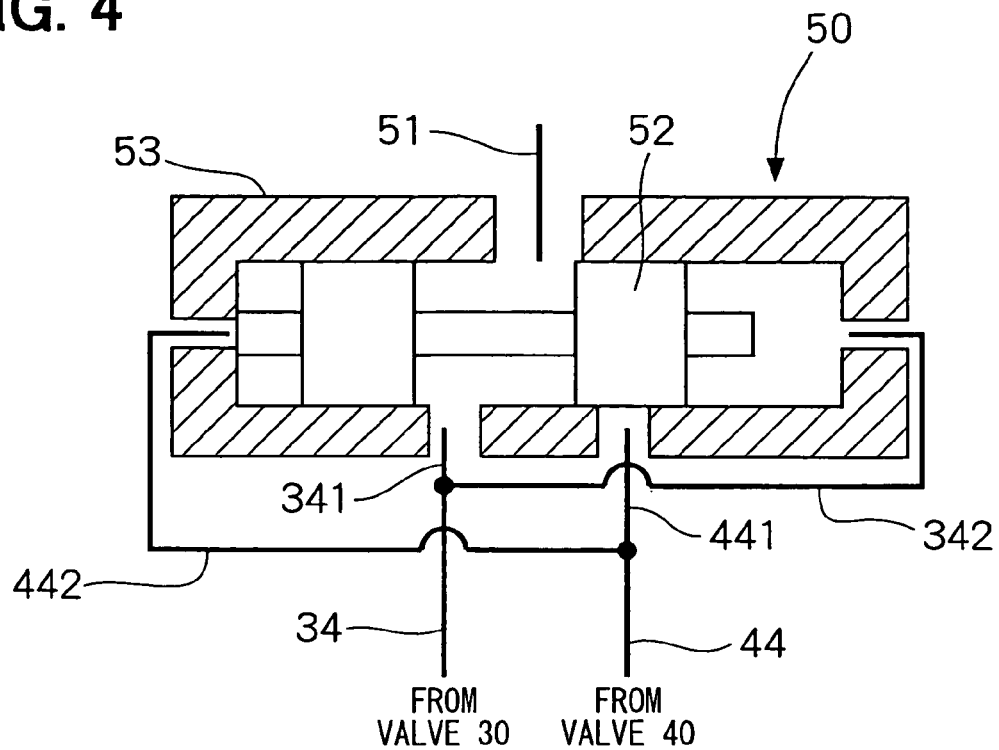
FIG. 4 is a schematic view showing the switching valve according to the first embodiment, in which a second pressure modulating valve 40 becomes out of order.

As in the same manner to the first pressure modulating valve 30, in the case that the second pressure modulating valve 40 becomes out of order and a high pressure of the working oil can not be outputted from the second pressure modulating valve 40, the oil pressure from the first pressure modulating valve 30 becomes higher than that from the second pressure modulating valve 40. Then, the spool 52 is moved in the leftward direction, as shown in FIG. 4, that is, a direction toward the sub chamber 50c connected to the sub-passage 442. As a result, the main passage 441 of the second pressure modulating valve 40 is disconnected from the oil pressure supply passage 51, whereas the main passage 341 from the first pressure modulating valve 40 is connected with the oil pressure supply passage 51 through the main chamber 50a. The oil pressure of the working oil is supplied to the respective electromagnetic oil pressure control valves 21 to 26 through the communication between the main passage 341 and the oil pressure supply passage 51 in the switching valve 50, and through the respective oil pressure sub-passages 71 to 76. Accordingly, the modulated oil pressure can be supplied from the first pressure modulating valve 30 to the respective electromagnetic oil pressure control valves 21 to 26, even in the case that the second pressure modulating valve 40 becomes out of order.

As described above, according to the first embodiment, the switching valve 50 connects the electromagnetic oil pressure control valves 21 to 26 with one of the pressure modulating valves 30 and 40, which is operating in the normal condition, even in the case that one of the pressure modulating valves 30 and 40 becomes out of order and thereby the sufficient high pressure of the working oil can not be outputted from such pressure modulating valve 30 or 40. Since the modulated oil pressure can be supplied to the electromagnetic oil pressure control valves 21 to 26 through the switching valve 50, either from the first pressure modulating valve 30 or the second pressure modulating valve 40, the operation (the engagement or disengagement) of the friction engagement elements 61 to 66 can be controlled by the respective electromagnetic oil pressure control valves 21 to 26. As a result, even when one of the pressure modulating valves 30 and 40 becomes out of order, a driving force from the engine can be sufficiently transmitted to the vehicle wheels through the automatic transmission, and furthermore all of the gear change positions of the automatic transmission can be used for the vehicle running, so that the vehicle running at a high load is possible and thereby a safety of the vehicle running can be improved.

In the case that both of the pressure modulating valves 30 and 40 are operating in order, the switching valve 50 connects the oil pressure supply passage 51 with both of the main passages 341 and 441 of the pressure modulating valves 30 and 40, as already described above. Accordingly, the friction engagement elements 61 to 66 can be operated with the sufficient amount and pressure of the working oil from both of the pressure modulating valves 30 and 40. As a result, even if the number of the friction engagement elements 61 to 66 is increased, they can be operated (engaged or disengaged) by the sufficient amount and pressure of the working oil.

Second Embodiment

Figure 5:
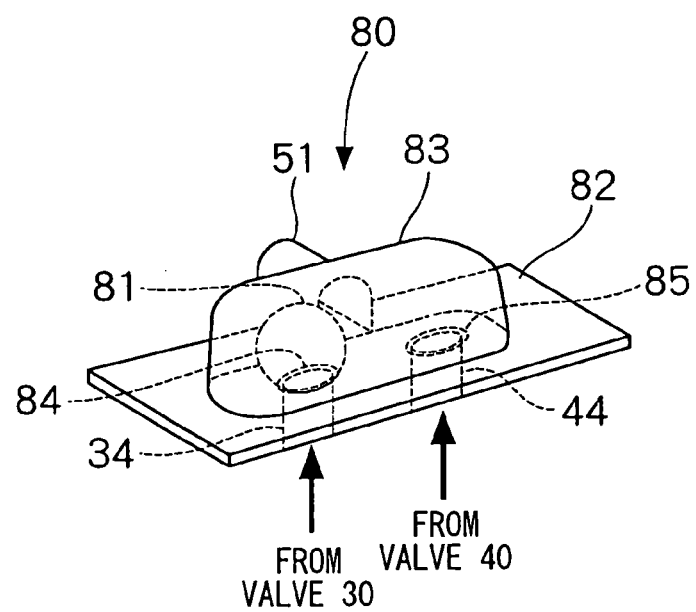
FIG. 5 is a schematic perspective view showing a switching valve for the oil pressure control device according to a second embodiment.

A switching valve of the oil pressure control device according to a second embodiment is shown in FIG. 5. In the drawing, the same portions to the first embodiment are designated by the same reference numerals.

The second embodiment differs from the first embodiment in the structure of the switching valve. A switching valve 80 of the second embodiment comprises a ball member 81, as shown in FIG. 5. The switching valve 80 further has a switching chamber 83, which is formed in a casing 82. Openings 84 and 85, which are respectively connected to the first and second pressure modulating valves 30 and 40 through the oil pressure passages 34 and 44, are formed in the switching chamber 83. The oil pressure supply passage 51 is also connected to the switching chamber 83, so that the oil pressure from the first and/or second pressure modulating valves is connected to the oil pressure supply passage 51 through the switching chamber 83.

Figure 6:
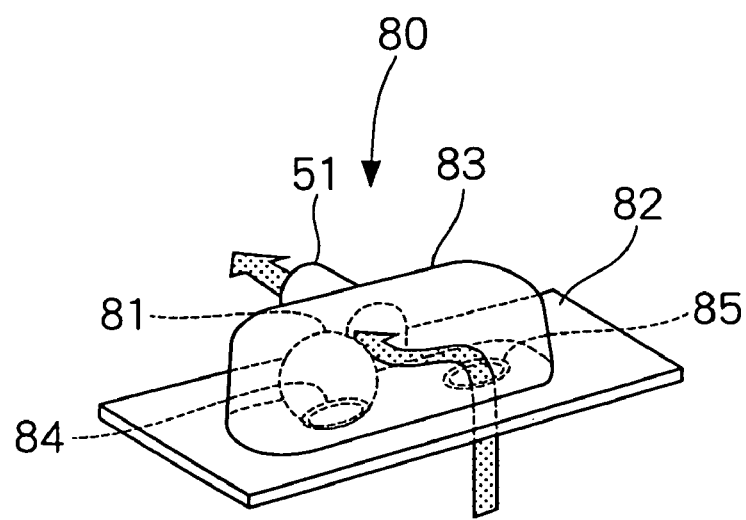
FIG. 6 is a schematic perspective view showing the switching valve for the oil pressure control device according to the second embodiment, in which oil pressure in one of oil passage is decreased.
Figure 7:
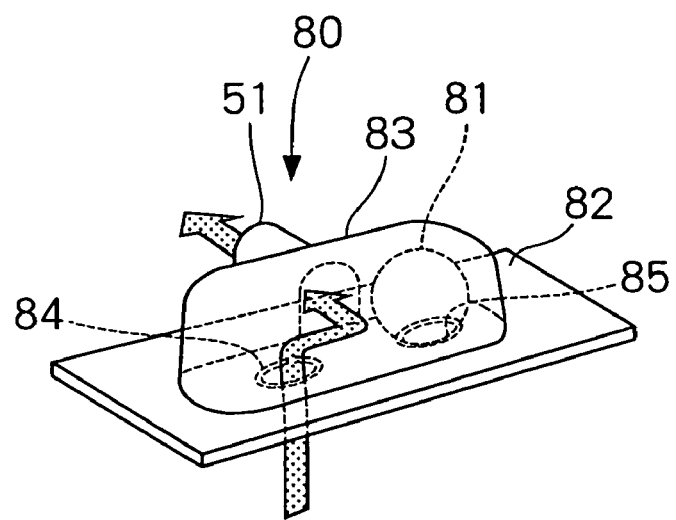
FIG. 7 is a schematic perspective view showing the switching valve for the oil pressure control device according to the second embodiment, in which oil pressure in the other oil passage is decreased.

In the second embodiment, when one of the oil pressure in the oil pressure passages 34 and 44 is decreased, namely when the pressure from one of the pressure modulating valves 30 and 40 is decreased, the ball member 81 is moved in the switching chamber due to a pressure difference therein. In the case that the pressure from the second pressure modulating valve 40 becomes higher than that from the first pressure modulating valve 30, the ball member 81 is moved toward the opening 84 (toward the oil pressure passage 34), as shown in FIG. 6, due to the pressure difference, so that the opening 84 is closed. Then the switching valve 80 disconnects the communication between the first pressure modulating valve 30 and the electromagnetic oil pressure control valves 21 to 26, whereas the electromagnetic oil pressure control valves 21 to 26 are kept connected to the second pressure modulating valve 40.

In the case that the pressure from the first pressure modulating valve 30 becomes higher than that from the second pressure modulating valve 40, the ball member 81 is moved toward the opening 85 (toward the oil pressure passage 44), due to the pressure difference, so that the opening 85 is closed. Then the switching valve 80 disconnects the communication between the second pressure modulating valve 40 and the electromagnetic oil pressure control valves 21 to 26, whereas the electromagnetic oil pressure control valves 21 to 26 are kept connected to the first pressure modulating valve 30.

In the second embodiment, the passages are switched over by the movement of the ball member 81 in the switching valve 80, and thereby the structure of the switching valve 80 becomes simpler. As described above, the ball member 81 closes the opening 84 or 85 due to the pressure difference between the oil pressure passages 34 and 44. Accordingly, the switching valve 80 connects the electromagnetic oil pressure control valves 21 to 26 with at least one of the pressure modulating valves 30 and 40, which are operating in order. As above, the oil pressure of the working oil to the electromagnetic oil pressure control valves 21 to 26 can be switched over by the simple structure.

In the above embodiments, the electromagnetic valves are used for the oil pressure control valves 21 to 26. However, those oil pressure control valves 21 to 26 can be not electronically but hydraulically operated.

Further, in the above embodiments, six oil pressure control valves 21 to 26 and two pressure modulating valves 30 and 40 are explained. However, the number of oil pressure control valves can be changed in accordance with the number of gear change positions (the number of the friction engagement elements) of the automatic transmission, and the number of the pressure modulating valves can be also changed.

Furthermore, in the above embodiments, the switching valve 50 and 80 are shown and explained as the mechanically operated valve. However, the switching valve 50 or 80 can be made of an electromagnetically driven valve.

What is claimed is:

1. An automatic transmission of a vehicle comprising:
   multiple oil pressure control valves to be connected to multiple friction engagement elements for controlling an oil pressure of a working oil to be supplied to the respective friction engagement elements, so that each of the friction engagement elements is engaged or disengaged depending on the oil pressure applied thereto;
   a line pressure generating means for generating a line pressure;
   multiple pressure modulating valves to be connected to the line pressure generating means for modulating the line pressure of the working oil to be supplied to the oil pressure control valves; and
   a switching valve provided between the pressure modulating valves and the oil pressure control valves,
   wherein the switching valve is connected to all of the oil pressure control valves through an oil pressure supply passage, and
   wherein the oil pressure supply passage is operatively connected to one of the pressure modulating valves the oil pressure from which is at a normal operating pressure, whereas the oil pressure supply passage is operatively disconnected from the other pressure modulating valve the oil pressure from which is lower than the normal operating pressure, when a pressure difference between the oil pressures from the pressure modulating valves becomes higher than a predetermined value.

2. An automatic transmission according to claim 1, wherein
   at least one of the oil pressure control valves is made of an electromagnetic oil pressure control valve.

3. An automatic transmission according to claim 1, wherein
   the switching valve comprises a spool which is movably supported in a casing of the switching valve, wherein the spool is axially moved by the pressure difference between the oil pressures from the pressure modulating valves.

4. An automatic transmission according to claim 1, wherein
   the switching valve comprises a ball member which is movably supported in a switching chamber of the switching valve,
   wherein the switching chamber has inlet openings respectively connected to the pressure modulating valves, and
   wherein the ball member is moved in the switching chamber by the pressure difference between the oil pressures from the pressure modulating valves, and closes one of the inlet openings, the oil pressure at which is lower than that at the other inlet opening.

5. An automatic transmission according to claim 1, wherein
   the oil pressure supply passage is connected to both of the pressure modulating valves, when both of the pressure modulating valves are operating in order.

* * * * *